Sept. 16, 1952          A. J. MERLES          2,610,720
POSITIONING DEVICE
Filed Oct. 14, 1947          5 Sheets-Sheet 1
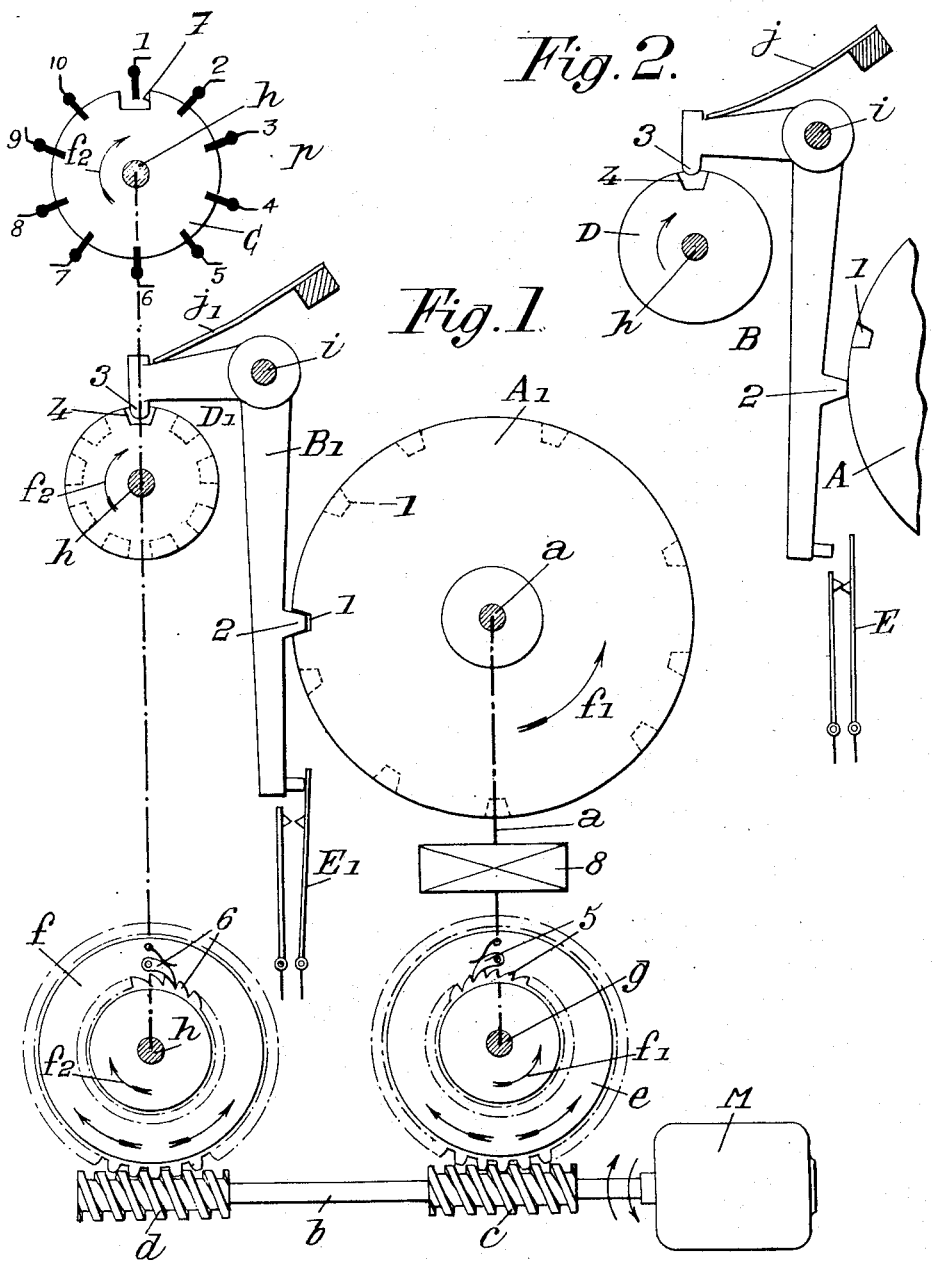
INVENTOR
ANTOINE JEAN MERLES,
BY
Robert B. Pearson
ATTORNEY Patented Sept. 16, 1952

2,610,720

UNITED STATES PATENT OFFICE 2,610,720

POSITIONING DEVICE

Antoine Jean Merles, Paris, France

Application October 14, 1947, Serial No. 779,704
In France April 22, 1947

3 Claims. (Cl. 192—142)

The present invention relates to devices for positioning parts that is to say devices intended to permit of bringing a part or a system into any of several predetermined positions, eventually modifiable at will, and it is more especially, although not exclusively, concerned with devices of this kind for the control of transmitting or receiving radio electric sets.

Preferred embodiments of the present invention will be hereinafter described with reference to the accompanying drawings, given merely by way of example, and in which:

Fig. 1 is a diagrammatic view of an apparatus according to the invention for positioning an axis (for instance the axis of a condenser), having multiple working positions;

Fig. 2 is a partial view corresponding to a position of the parts different from that shown by Fig. 1.

Figure 3:
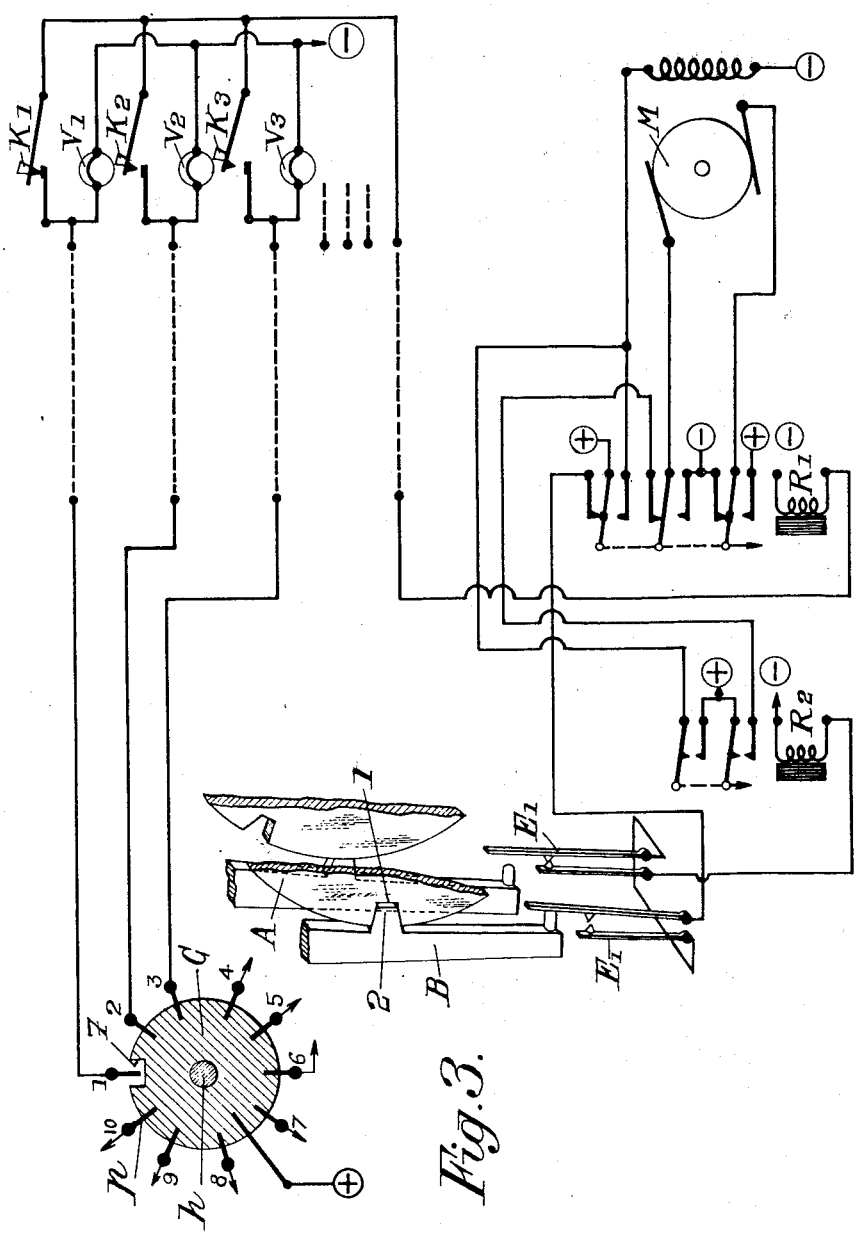
Fig. 3 shows an electric diagram to be used with the apparatus of Fig. 1, Figs. 4 and 5 are diagrammatical views analogous to those of Figs. 1 and 3 and corresponding to a second embodiment of my invention.

In the following description, it will be supposed that my invention is applied to a receiving or transmitting station for radio electric transmission, said station including a part or element such as a condenser (inductance coil, resistor etc.) adapted to occupy any of various positions, corresponding for instance to various frequencies. The device according to my invention is a positioning device which enable the operator to determine the frequencies on which he wishes to transmit or to receive.

It is of interest in many cases, and in particular on aeroplanes, to make use of such positioning devices, in particular with a view to enabling the pilot to control the radio set from a distance.

Various devices of this kind already exist.

Some are exclusively of electrical nature, bringing into play an electric motor and suitable contact means. They do not provide for a mechanical locking of the part or parts to be controlled in each of their working positions, so that there is a risk of having this position modified, in particular due to vibrations. Furthermore if they ensure electrical control from a distance, they do not permit manual control, whereas it is of the highest interest to enable both the pilot to control from a distance the radio electric apparatus and the radio operator to act manually and directly on the set itself to perform any adjustment without being hindered by the electric telecontrol.

Other devices are of electromechanical nature, that is to say include on the one hand an electric motor for operating the shaft to be controlled and on the other hand mechanical positioning parts, in particular levers intended to cooperate with notches provided in positioning sectors or discs mounted on said shaft. But it should be noted that these mechanical positioning parts act merely as abutments and still do not ensure a positive locking of said axis so that in this case there is also a risk of the parts getting out of adjustment under the effect of vibrations. Furthermore, the fact that said parts work merely in abutment like fashion involves the necessity of rotating said shaft always in the same direction to bring it into any predetermined position.

It follows that manual control, if it were possible, should take place under certain conditions compelling the operator to take special precautions in order to avoid mistakes. Finally the fact that said operator is compelled to move the axis always in the same direction makes it impossible to adjust the circuits. This results from the fact that, if the operator wishes, outside of the positions predetermined by the positioning device, to use other adjustment positions, he must for this purpose be able to actuate the condenser shaft (or other variable element) in both directions since the position corresponding to tuning to a given frequency requires testing on either side of said tuning position.

In order to obviate the drawbacks of the usual systems I proceed in such a manner, according to my invention, that positioning is obtained, as provided for in the second of the two cases above examined, by means of mechanical parts, but that these parts can perform a positive locking of the shaft or other element to be controlled.

To comply with these conditions the movements, on the one hand, of the positioning and/or locking parts or levers and, on the other hand, of the shaft or other element to be controlled must have, at least temporarily, a certain relative independance. If both of these movements are obtained from the same motor, this can be obtained, for instance, in either of the two following ways:

In the embodiment illustrated by Figs. 1 to 3 during a first step of the control operation only the first of said parts are actuated, whereas the shaft to be controlled remains stationary and, during a second step, this shaft is driven in a given direction and comes to be locked by one of said parts corresponding to the position that has been chosen.

Figure 4:
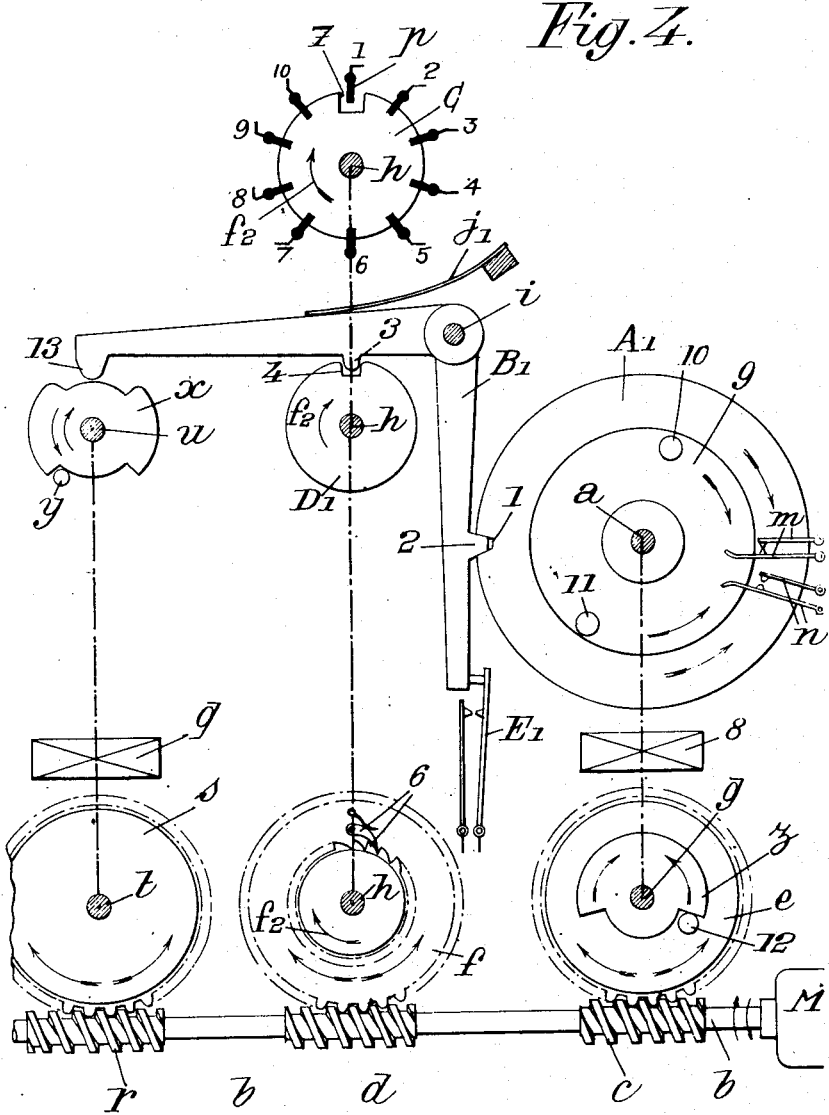
Figure 5:
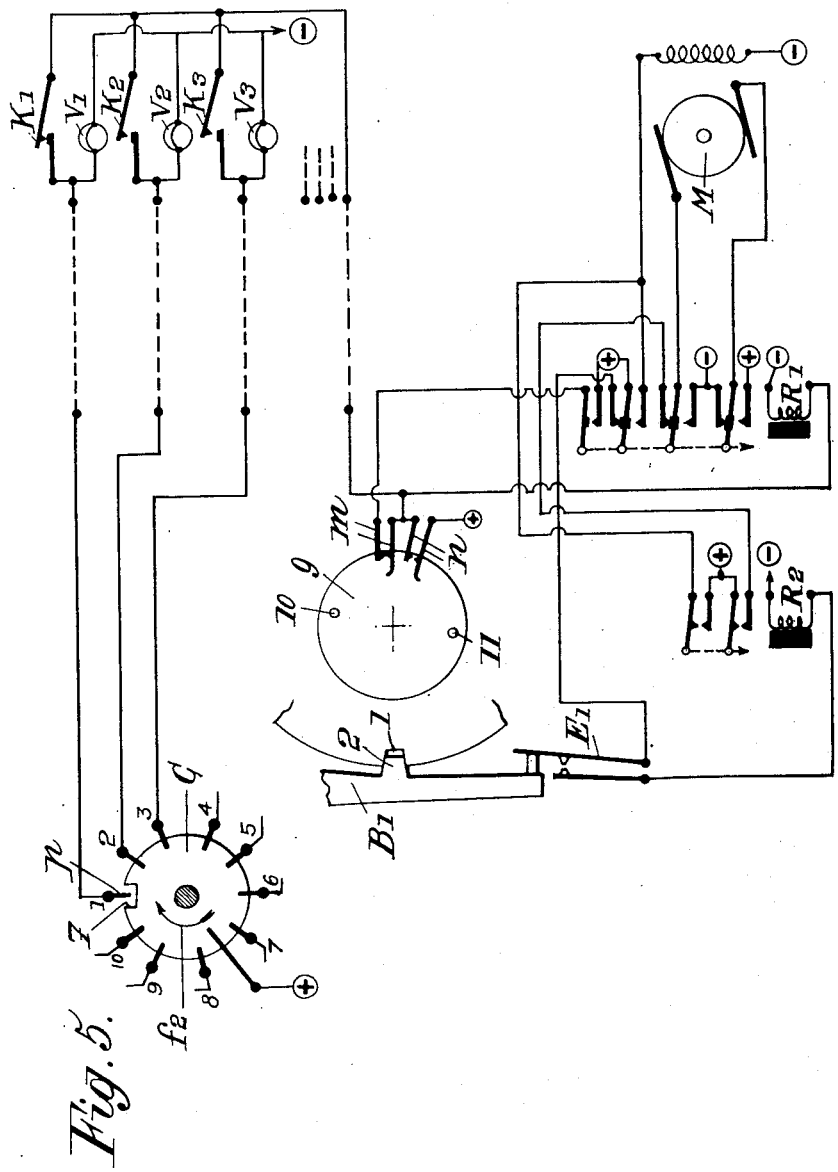
Figure 6:
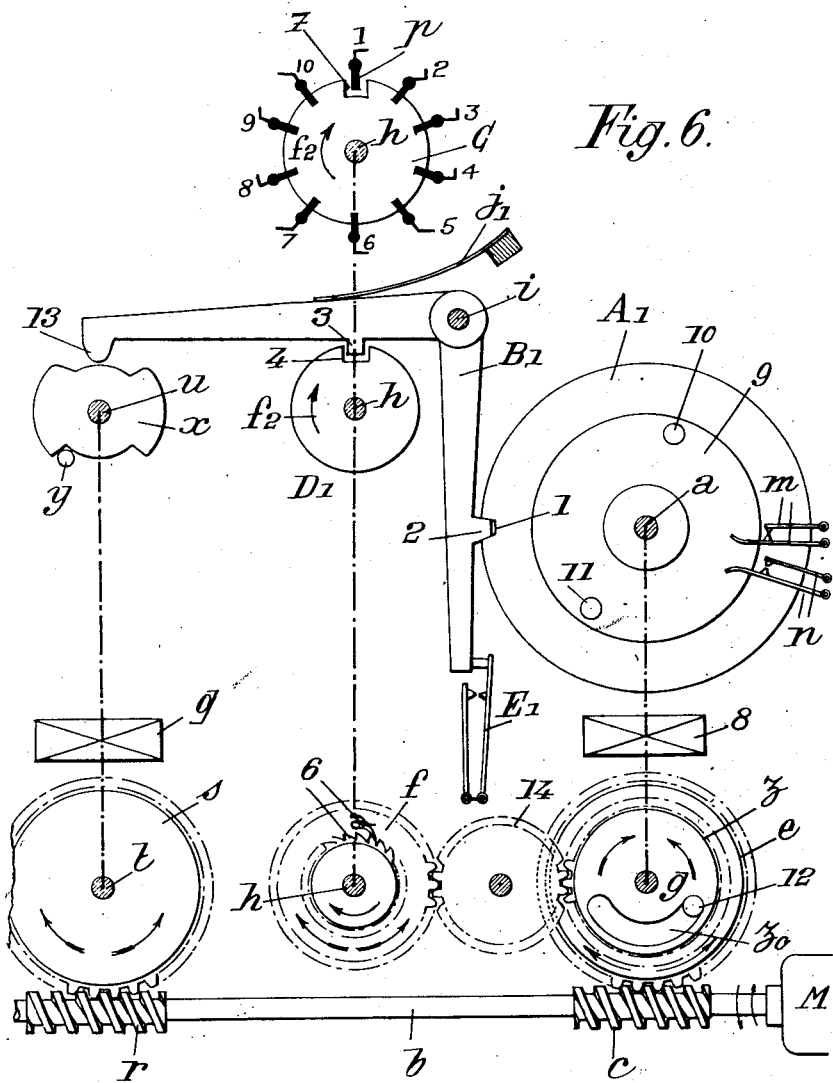
Fig. 6 is a diagram analogous to that of Fig. 4 and corresponding to a modification.

In the embodiment illustrated by Figs. 4 to 6 the shaft to be controlled, although it can be driven alternately in one direction or the other by the motor, remains however stationary owing to the use of unilateral driving means, during suitable intervals where the positioning and locking parts or levers are actuated, the final result being the same as above.

The first embodiment, according to which the shaft is driven always in the same direction by the motor can be used every time the rotation of the shaft to be controlled is not mechanically limited. On the contrary, the second one will be preferable when the angular movement of the element to be controlled is limited by constructional conditions.

These arrangements will generally permit manual operation independently of the motor and without having to disconnect the parts owing to the use of free wheel clutches or equivalent means. Furthermore, when the shaft to be controlled is driven through a friction device, it will be possible to drive said shaft manually in one direction or the other to perform any adjustment.

According to the first embodiment, illustrated by Figs. 1–3, the device is intended to position a shaft $a$ used for driving, through any mechanical device (gears, racks, etc), a part such as a variable condenser, and adjustable inductance coil, or resistance etc., this shaft being able to occupy any of a number of positions, say ten. For this purpose I fit on said shaft $a$, in a manner adjustable at will by the operator, ten discs A ($A_1$, $A_2$, ... $A_{10}$) including each a notch 1 intended to permit positive locking engagement with the finger 2 of one of the locking levers.

To each of these discs there corresponds a locking lever B ($B_1$, $B_2$, ... $B_{10}$) with a finger 2, this lever being independent and movable about an axis $i$. Springs $j$ ($j_1$, $j_2$ ... $j_{10}$) push said levers in the direction that tends to urge fingers 2 towards discs A and also fingers 3, carried by a second arm of said levers, towards cams D. Finally means such as contact E, inserted in suitable electric circuits, are provided to stop shaft $a$, when locking has been performed at 1, 2.

On another shaft $h$ are mounted ten cams D ($D_1$, $D_2$ ... $D_{10}$) corresponding each to one lever B and one disc A. These cams, rigid with axis $h$, are positioned at an angle of 36° from one another and are each provided with a notch intended to cooperate with the corresponding finger 3.

Shafts $a$ and $h$ are driven from a motor M in such manner as to comply with the following conditions:

Shaft $h$ is to be first driven, until cams D have assumed a position corresponding to that which is to be imparted to axis $a$;

Shaft $h$ being then stopped, shaft $a$ is started until the tooth 1 of the disc A corresponding to said position comes into locking engagement with the finger 2 of the corresponding arm, the whole then stopping under the action of contact or contacts E.

For this purpose, I make use of two free wheel clutches 5 and 6 to transmit the movement of the shaft $b$ of motor M respectively to shaft $a$ and to shaft $h$, these free wheel clutches being mounted in opposed directions so that only one of the two shafts can be driven at a time and shaft $h$ first (arrows $f_1$ and $f_2$ indicate on the drawings the direction of rotation).

When shaft $h$ and its cams have reached their chosen positions, reversing of the rotation of motor M is obtained through any suitable electrical arrangement such as that hereinafter described, in combination with a ten positions switch C mounted on shaft $h$ and including ten fixed contact studs numbered from one to ten and an insulating notch 7.

On the embodiment illustrated by the drawing, the free wheel clutches are operated by shaft $b$ through endless screws $c$, $d$, cooperating with wheels $e$, $f$.

Shaft $a$ is driven through shaft $g$ and of a friction clutch 8, which will permit manual control of said shaft $a$, therefore of the condenser, in both directions independently of motor M (free wheel 5 permitting movements in one direction whereas friction clutch 8 works in the other direction).

Said clutch further permits of absorbing the inertia effects of the motor. It further permits of operating several devices identical to that of Figs. 1–3 (therefore several parts controlled by distinct shafts $a$) from the same motor.

Concerning the electric diagram, it includes (Fig. 3): a control box (to permit control from a distance), this box comprising one contact K ($K_1$, $K_2$, ... $K_{10}$) for each position, and, preferably, signal lamps V, which will be for instance all switched on (or off), except the one that corresponds to the position that is chosen, these signal means permitting supervision from a distance; a reversing relay $R_1$, a stopping relay $R_2$ connected with contact or contacts $E_1$.

It has been supposed on the drawing that all contacts E are connected in series, but they could be replaced by a single contact which would be cut off by a mechanical device operated in response to the engagement of the tooth of any lever B into the corresponding notch 1. I may also dispense with stopping relay $R_2$ by providing two contacts E instead of one under each lever B or two contacts E for the whole of the levers B, as above stated, one of these two contacts being anyway intended to replace those of relay $R_2$. These solutions are given by way of example and have no limitative character.

The operation of such a system is as follows:

If it is supposed, for instance, that $K_1$ is closed and that the system is in position 1 (Fig. 1), it suffices in order automatically to obtain position 3 to close contact $K_3$, which characterizes this position, while opening contact $K_1$, that was closed.

Relay $R_1$ is then supplied with current through the following circuit: +, contact 3 of switch C, contact $K_3$, relay $R_1$ —. Relay $R_1$ is operated.

Motor M is applied with current, and turns in the direction corresponding to the drive of shaft $h$, i. e. in the direction of arrow $f_2$, so that discs D and switch C are rotated. This movement goes on until the insulating notch 7 of said switch comes opposite contact stud $p_3$, which brings relay $R_1$ back to rest position.

During this movement, lever B is first lifted under the action of tooth 3 leaving notch 4. It remains in this position, tooth 2 being therefore disengaged from notch 1. The other levers are also lifted as shown by Fig. 2. At the end of this movement, lever $B_3$ is in a position such that its finger 3 is opposite the notch 4 of disc $D_3$, whereas its finger 2 is rubbing on the periphery of the corresponding disc $A_3$.

On the other hand it should be noted that, as all levers B are lifted, contacts E are closed: it follows that as soon as relay $R_1$ comes back to rest the motor starts in the opposed direction under the action of relay $R_2$ which is energized by the following circuit: + taken on the plates of relay $R_1$ at rest, contacts E, relay $R_2$ and —.

This rotation of motor M causes shaft $a$ to be driven in direction $f_1$ whereas $h$ remains at rest. This rotation goes on until the tooth 2 of lever $B_3$ drops into the notch 1 of disc $A_3$, which is possible due to the fact that finger 3 is located opposite to notch 4 of disc $D_3$. Contact $E_3$ is then opened and relay $R_2$ comes back to rest. The motor stops and the operation is finished, its result having been to bring axis $a$ into the desired position 3 and positively to lock it in this position.

It will be found that such a system obviates all the above mentioned drawbacks.

It ensures positive locking, thus eliminating any risk of displacements of the parts due to vibration. The profile of tooth 2 and of notch 1 is studied so that they engage each other without play. The accuracy of positioning that can be obtained is very high. It is theoretically perfect and can be practically higher than $\frac{1}{10}$ of a degree including all plays.

It permits manual control since the radio operator can, independently of the operation of motor M, actuate shafts $a$ and $h$ provided for this purpose with knobs (not shown on the drawing). Shaft $h$ is operated in direction $f_2$ (owing to the free wheel clutch). Shaft $a$ can rotate in both directions as already stated (free wheel clutch at 5 or friction at 8). The operator needs not disconnect the motor.

It will be seen that anyway I obtain full independence of the two successive and different operations: choice of the position, and positioning proper.

Besides the above arrangement can be applied even if only manual control were provided.

Finally the whole is particularly simple from a constructional point of view. Furthermore, it permits the mounting of several devices of the same kind coupled together in such manner as to be operated by the same motor and synchronized concerning the choice of position.

In this case the shafts $h$ of all the devices are coupled together, for instance mechanically, this mechanical system then including a single switch C which will stop the common rotation of these shafts $h$ and of the corresponding cams D in the chosen position.

Shafts $a$ are thus controlled by the same motor which is to stop only when the contacts E for the same position belonging to the various devices are all open. The friction couplings of the first devices to be brought into engagement will slip during the time for which the other devices will keep rotating before being locked.

According to another embodiment, illustrated by Figs. 4 and 5, and in which it is supposed that the shaft $a$ of the apparatus to be controlled can turn through only a given angle, say 180°, the motor, which is still actuated first in one direction then in the other, drives said shaft successively in one direction and in the other, but with a lost motion between said motor and said shaft.

I may also, according to an independent feature (i. e. one which might be used in combination with the embodiment of Figs. 1 to 3) combine with the means for controlling locking levers B means adapted for lifting all the levers when so desired, in particular at the beginning of the operation, to release them subsequently after cams D have been set in position.

These features are illustrated in Figs. 4 and 5.

Discs A are mounted on axis $a$ as in the case of Figs. 1 and 2, and there is fixed thereon, eventually in an adjustable manner, a disc 9 carrying two abutments 10 and 11 at 180° from each other (in the example shown). Said abutments are adapted to act on means for shifting the direction in which motor M is running. These means are constituted by two sets of contacts $m$ (normally closed) and $n$ (normally open) interposed in a suitable electric system as that hereinafter described.

Shaft $a$ is driven through means ensuring the drive in both directions from shaft as $b$, with a lost motion connection constituted for instance by a lug 12 cooperating with a cam $z$ rigid with shaft $g$ (connected with shaft $a$ through friction coupling 8).

This cam is so arranged that at the beginning operation, shaft $a$ is driven with a given delay (eventually an adjustable one), that is to say after shaft $h$ has already been rotated.

The operation is the same as in Figs. 1 to 3 concerning shaft $h$ driven by free wheel clutch 6, said shaft carrying a set of cams D (or equivalent means) cooperating with a series of levers B arranged as above.

I further provide a cam $x$ mounted on a shaft $u$ and capable of lifting all the levers B through their fingers 13, said cam having its movement limited by a finger $y$ and being driven from shaft $b$, for instance through screw $r$ and wheel $s$ mounted on a shaft $t$, with the interposition of a friction coupling $q$.

Concerning the electrical lay-out (Fig. 5), it may be of the same kind as that of Fig. 3 with the further interposition of contacts $n$ and $m$ in the circuit that controls the motor reversal.

The system works in the following way:

Supposing that the device being in position 1, is desired to come into position 3, contact $K_3$ is operated. Motor M is started through relay $R_1$, which is closed as in the case of Figs. 1–3.

At the beginning the motor drives only shafts $h$ and $u$, for instance in the clockwise direction, whereas shaft $a$ remains stationary, owing to the nature of connection 12, $z$.

Cam $x$ then lifts all levers B which releases discs A. Then finger $y$ stops cam $x$, axis $t$ being allowed to keep turning owing to the provision of friction clutch $q$.

Shortly after this, abutment 12 comes into engagement with cam $z$ therefore causing shaft $g$ and consequently also shaft $a$ and discs A to be driven.

In the course of this rotation, relay $R_1$ remains supplied with current, both through the circuit of switch C and contact $K_3$ and through the following maintaining circuit: +, contacts of relay $R_1$, contacts $m$, winding of relay $R_1$ —.

Discs A will keep rotating until abutment 10 comes against contact $m$ and opens it, which has for its effect to cut off the maintaining circuit of relay $R_1$.

But the motor can still run owing to friction coupling 8, and keeps driving shaft $h$ until the notch 7 of switch C comes opposite stud $p_3$: then relay $R_1$ ceases to be fed with current and comes back to inoperative position.

Said motor then starts in the reverse direction since, as all levers B have been lifted by cam $x$, all contacts E are closed and relay $R_2$ is energized as above through the contact $R_1$ in position of rest.

Owing to free wheel clutch 6, cams D and switch C remain in position. Lever $B_3$ will therefore be free subsequently to move into locking position, since its tooth 3 is opposite the notch 4 of cam $D_3$, and, on the other hand, cam $x$ is caused to release all levers B, since shaft $u$ is driven in the reverse direction. Friction coupling $q$ permits the movement to go on, after cam $x$ has been again stopped at $y$.

As for shaft $a$, it is itself driven in the reverse direction but with a delay with respect to shaft $u$, owing to connection 12–$z$.

When the notch 1 of disc $A_3$ comes opposite the tooth 2 of lever $B_3$ mechanical locking occurs and the cycle is finished: the motor then stops, owing to the opening of contact $E_3$ produced by lever $B_3$, which opening brings relay $R_2$ into inoperative position.

Contacts $n$ constitute a safety device since, if locking does not take place, for any reason, abutment 11 will close contacts $n$, which will cause a new starting of the motor in the opposed direction, the cycle being fully reproduced.

It should be noted that, as in the first case, friction coupling 8 is intended to absorb inertia effects and further permits manual control independently of the telecontrol. Furthermore said manual control means can be used as well for the marked positions corresponding to cams D as for any other positions whatever.

In order to work on marked positions the operator is to perform the following operations:

To move the knob which controls shaft $u$ and cam $x$ in the direction which causes levers B to be lifted (supposing that they are lowered);

To move the knob that controls axis $h$ in the direction $f_2$ that corresponds to free-wheel clutch running, until this knob is brought into the desired position (1, 2 ... 10).

To move the knob of cam $x$ to permit the lowering of levers B, and,

To move the knob controlling shaft $a$, until locking takes place.

On the contrary, if the operator is to work on any other position of shaft $a$ it suffices:

To operate the knob that controls shaft $u$ and cam $x$ in such manner as to cause the lifting of all levers B and to keep them lifted;

And, without touching shaft $h$, to operate the knob that controls shaft $a$ which is then quite free, Cam $x$, in addition to the advantages it has from the point of view of this double possibility of manual control, also permits of avoiding any false move that might produce excessive stresses between cams D and levers B.

I might even eliminate any stress on cams D by having levers B lifted by the motor through cam $x$, owing to a delay in the movement of axis $h$ with respect to that of axis $t$ and $u$.

It suffices for this purpose, as shown by Fig. 6, to drive wheel $f$ through a lost motion connection which may be common with that for ensuring the drive of shaft $g$. This figure shows that disc $z$, which is provided with a slot $Z_0$ for the passage of finger 12, drives through intermediate gear 14 the wheel $f$ that carries free wheel clutch 6.

In this case there is no stress between teeth 3 and notches 4. Furthermore it is possible to lock cams D by means of lever B in the engaged position.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

I claim:

1. A device for positioning a shaft in a frame which comprises, in combination, a plurality of juxtaposed discs fixed on said shaft coaxially therewith, each disc being provided with a radial notch in its periphery, said notches being located in different radial planes respectively with respect to said shaft, a plurality of levers located in the planes of said discs respectively and pivoted in said frame about an axis parallel to said shaft, each of said levers being provided with a projection adapted to fit into the notch of the corresponding disc, spring means for urging said levers toward said discs respectively, a second shaft parallel to the first mentioned one, a plurality of selecting cams fixed on said second shaft, each cam being in the form of a circular disc with a notch at a point of the circumference thereof, said levers being provided with arms adapted to cooperate with said cams and to engage in the notches thereof respectively, said last mentioned notches being located in different radial planes respectively with respect to said second shaft, a third shaft parallel to the two first mentioned ones, a plurality of lever retracting cams fixed to said third shaft adapted to cooperate with said arms, abutment means for limiting the rotation of said third shaft to two angular positions, one for which said lever retracting cams are in operative position and the other for which said last mentioned cams are in inoperative position, a motor, transmission means between said motor and said third shaft for bringing said third shaft in the first of said angular positions immediately upon the starting of said motor, switch means for presetting said selecting cams, transmission means between said motor and said first and second shafts for successively bringing said second mentioned shaft into the position set by said switch means and rotating said first mentioned shaft through its whole angular range of rotation to bring into the notch of its disc the projection of the lever the arm of which is opposite the notch of its selecting cam, the transmission means between the motor and the third shaft being arranged to bring said third shaft in said second position thereof immediately before said rotation of the first mentioned shaft, and means operative by said levers for stopping said motor after engagement of said last mentioned lever with its disc.

2. A device for positioning a shaft in a frame which comprises, in combination, a plurality of juxtaposed discs fixed on said shaft coaxially therewith, each disc being provided with a radial notch in its periphery, said notches being located in different radial planes respectively with respect to said shaft, a plurality of levers located in the planes of said discs respectively and pivoted in said frame about an axis parallel to said shaft, each of said levers being provided with a projection adapted to fit into the notch of the corresponding disc, spring means for urging said levers toward said discs respectively, a second shaft parallel to the first mentioned one, a plurality of selecting cams fixed on said second shaft, each cam being in the form of a circular disc with a notch at a point of the circumference thereof, said levers being provided with arms adapted to cooperate with said cams and to engage in the notches thereof respectively, said last mentioned notches being located in different radial planes respectively with respect to said second shaft, a third shaft parallel to the two first mentioned ones, a plurality of lever retracting cams fixed to said third shaft adapted to cooperate with said arms, an electric motor, transmission means between said motor and said first mentioned shaft including a lost motion connection and a slipping friction clutch, transmission means between said motor and said second shaft including a one-way clutch operative for one direction of running of said motor, transmission means between said motor and said third shaft including a slipping friction clutch, abutment means for limiting the rotation of said third shaft to two angular positions, one for which said lever retracting cams are in operative position and the other for which said last mentioned cams are in inoperative position, switch means, including a part driven by said second shaft, for operating said motor in said direction until said second shaft comes into a given position chosen at will, said retracting cam being adapted to come into operative position immediately upon the starting of the motor in said direction, means, including contacts operative by said levers for automatically running said motor in the opposed direction upon the stopping of its operation in said first mentioned direction, and means, including said contacts for automatically stopping said motor when the notch in one of said discs is engaged by its corresponding lever, the arm of which is located opposite the notch of the corresponding cam.

3. A device according to claim 2 further including contact means carried by said first mentioned shaft for repeating the whole operation in case of failure of the projection of the selected lever to engage in the notch of its disc.

ANTOINE JEAN MERLES.

REFERENCES CITED

The following references are of record in the file of this patent:

UNITED STATES PATENTS

| Number | Name | Date |
|---|---|---|
| Re. 22,574 | Collins | Dec. 5, 1944 |
| 2,231,156 | Claytor | Feb. 11, 1941 |
| 2,391,470 | May | Dec. 25, 1945 |
| 2,431,408 | MacSorley | Nov. 25, 1947 |
| 2,470,567 | May | May 17, 1949 |
| 2,472,979 | May | June 14, 1949 |
| 2,553,951 | Stamper | May 22, 1951 |